United States Patent
Seok et al.

(10) Patent No.: US 8,310,999 B2
(45) Date of Patent: Nov. 13, 2012

(54) MESH DETERMINISTIC ACCESS (MDA) PROCEDURE IN WIRELESS MESH NETWORK AND WIRELESS DEVICE SUPPORTING THE SAME

(75) Inventors: Yong Ho Seok, Anyang-si (KR); Alexander A. Safonov, Anyang-si (KR)

(73) Assignee: LG Electronics Inc., Seoul (KR)

( * ) Notice: Subject to any disclaimer, the term of this patent is extended or adjusted under 35 U.S.C. 154(b) by 1019 days.

(21) Appl. No.: 12/266,442

(22) Filed: Nov. 6, 2008

(65) Prior Publication Data

US 2009/0122774 A1 May 14, 2009

(30) Foreign Application Priority Data

Nov. 9, 2007 (KR) .................. 10-2007-0114016

(51) Int. Cl.
*H04W 4/00* (2009.01)
*H04W 40/00* (2009.01)
(52) U.S. Cl. .................. 370/329; 370/338; 455/445
(58) Field of Classification Search .................. None
See application file for complete search history.

(56) References Cited

U.S. PATENT DOCUMENTS

2006/0251119 A1 11/2006 Ramesh
2007/0060141 A1 3/2007 Kangude et al.

OTHER PUBLICATIONS

Seok, Safanov & Denteneer, MDA Extension for Broadcast/Multicast Transmission, Sep. 2007, IEEE 802.11-07/2575r1, all pages.*

Yongho Seok, Alexander Safonov: "MDA Extension for Broadcast/Multicast Transmission" IEEE 802.11 Mesh Networking Task Group Meeting, Sep. 20, 2007, pp. 1-10, XP002509980.

Yongho Seok, Alexander Safonov: "MDA Extension for Multicast/Broadcast Transmission, normative text proposal" IEEE 802.11 Mesh Networking Task Group Meeting, Nov. 12, 2007-Nov. 15, 2007 pp. 1-7, XP002509981.

802.11 Working Group of the IEEE 802 Committee: "Draft Standard for Information Technology—Telecommunications and information exchange between systems—Local and metropolitan area networks—Specific Requirements" Part 11: Wireless LAN Medium Access Control (MAC) and Physical Layer (PHY) Specifications, IEEE P802.11S/D1.06, Jul. 2007, pp. 1-246, XP002509982.

Stephen G. Rayment: "Sep. 2007 Mesh Minutes" IEEE P802.11 Wireless LANs, Sep. 21, 2007, pp. 1-25, XP002509983.

* cited by examiner

*Primary Examiner* — Chirag Shah
*Assistant Examiner* — Srinivasa Reddivalam
(74) *Attorney, Agent, or Firm* — Lee, Hong, Degerman, Kang & Waimey

(57) ABSTRACT

Provided are a procedure for mesh deterministic access (MDA) in wireless mesh network and a wireless device supporting the procedure. In the method, an intended transmitter transmits an a mesh deterministic access opportunity (MDAOP) setup request message including information for specifying times of a new MDAOP set and information for identifying the new MDAOP set to intended receivers. In this case, the MDAOP setup request message is a setup request message for a broadcast MDAOP. And, the intended transmitter receives an MDAOP setup reply message including a reply code from the intended receivers. The reply code may indicate either accept or refusal of the request for the new MDAOP set.

8 Claims, 8 Drawing Sheets

| Reply code | Meaning |
|---|---|
| 0 | Accept |
| 1 | Reject: MDAOP Set reservation conflict |
| 2 | Reject: MAF limit exceeded |
| Other | Reserved |

| Octets: 1 | 4 | ... | 4 | Octets: 1 | 4 | ... | 4 |
|---|---|---|---|---|---|---|---|
| Number of Unicast MDAOPs | Unicast MDAOP 1 | ... | Unicast MDAOP n | Number of Broadcast MDAOPs | Broadcast MDAOP 1 | ... | Broadcast MDAOP n |

MESH DETERMINISTIC ACCESS (MDA) PROCEDURE IN WIRELESS MESH NETWORK AND WIRELESS DEVICE SUPPORTING THE SAME

CROSS-REFERENCE TO RELATED PATENT APPLICATIONS

This application claims the benefit of earlier filing date and right of priority to Korean Patent Application No. 10-2007-0114016 filed on Nov. 9, 2007 in the Korean Intellectual Property Office, the disclosure of which is incorporated herein in its entirety by reference.

BACKGROUND

1. Field of the invention

The present invention relates to a wireless local access network (WLAN), and more particularly, to a mesh deterministic access (MDA) procedure in a wireless mesh network and a device supporting the MDA procedure.

2. Description of the Related Art

With the recent development of information communication technology, a variety of wireless communication technology has been developed. A WLAN is the technology permitting wireless access to Internet in home or companies or specific service areas by the use of portable terminals such as a personal digital assistant (PDA), a laptop computer, and a portable multimedia player (PMP) on the basis of a radio frequency technology.

The IEEE (Institute of Electrical and Electronics Engineers) 802 which is a standardization of the WLAN technology established in February, 1980 has carried out much standardization work. In the initial WLAN technology, a data rate of 1 to 2 Mbps was supported by the use of frequency hopping, spread spectrum, and infrared communication using a frequency of 2.4 GHz in accordance with the IEEE 802.11. In recent years, 54 Mbps in maximum can be supported by the use of the orthogonal frequency division multiplex (OFDM) technology to the WLAN. In addition, the IEEE 802.11 has developed or is developing a variety of technical standards for improvement in quality of service (QoS), compatibility of an access point (AP) protocol, security enhancement, wireless resource measurement, wireless access in vehicular environment, fast roaming, wireless mesh network, inter-working with external networks, wireless network management, and the like.

The "wireless mesh network" can support direct communication between plural wireless stations having a relay function. In view of functionality, a distribution system (DS) of an AP can be replaced with an inter-operable wireless link or a multi-hop path between the plural wireless stations. In the mesh network, one wireless station can set up a peer-to-peer wireless link interworking with one or more neighboring wireless stations, thereby constructing a more flexible network.

In the wireless mesh network, one wireless station can establish plural peer links with each of other wireless stations. Thus, plural communication paths can exist between two wireless stations. Among them, the direct communication paths between two neighboring wireless stations are called a wireless mesh link or a mesh peer link or a peer link. The wireless stations are called mesh points (MP), which is only an example. A wireless station performing the function of an AP is called mesh access point (MAP).

Such a wireless mesh network has advantages such as flexibility in constructing a network, reliability due to bypass paths, reduction in power consumption due to a decrease in communication distance. More specifically, it is possible to construct a flexible network between the MPs using the mesh network even in places not including any existing communication network. In the mesh network, the plural MPs are connected to each other to guarantee plural bypass paths. Accordingly, even when one MP is out of order, data can be transmitted through another path. In the mesh network, since the coverage of one MP is not wide but the communication is made through a neighboring MP, telecommunication can be permitted with low power.

On the other hand, message transmission types can be classified into a unicast type, a multicast type, and a broadcast type. In the unicast type, the number of receivers receiving a transmission message is one. However, in the multicast and broadcast types, the number of receivers receiving a transmission message is plural. For example, in the unicast type, a reception address of a transmission message is specified as an address for identifying one terminal, for example, a medium access control (MAC) address. In the multicast or broadcast type, the reception address of a transmission message can be specified as a multicast group address. In the broadcast type, the multicast group address specifies all terminals. Accordingly, it should be understood that the "broadcast" or "multicast" described in the following description includes multicast or broadcast together, except that the application thereof is not possible in nature.

SUMMARY OF THE INVENTION

In a wireless LAN, non-AP STAs communicate with each other via an AP. In this case, the AP as an adjuster allocates radio resources for the non-AP STAs. In this case, a non-AP STA need not know how radio resources other than the radio resources allocated thereto. This is because there is generally no problem with interference due to the communication of other non-AP STAs by using the radio resources adjusted and allocated thereto by the AP.

On the other hand, in a wireless mesh network, MPs communicate directly with each other through a mesh peer link. A large number of MPs may exist in the wireless mesh network and the MPs can freely set up a mesh peer link with each other. When it is assumed that N MPs exists, $N(N-1)/2$ mesh peer links in maximum can be set up in theory. Some mesh peer links (when two MPs having set up a mesh peer link are different every mesh peer link) of the $N(N-1)/2$ mesh peer links are apart from each other not to interfere with each other, but some mesh peer links (when mesh peer links within two hops or mesh peer links close to each other) of the $N(N-1)/2$ mesh peer links may interfere with each other. Accordingly, a resource allocation mechanism in the wireless mesh network need consider the interference between the mesh peer links.

The radio resources are as limited in a wireless mesh network as other wireless network. When a large number of MPs forms the wireless mesh network, the contention of the MPs intending to acquire transmission opportunity becomes more severe. Accordingly, there is a need for a mechanism enabling to efficiently utilize the radio resources in the wireless mesh network. Since the receiver in the unicast is a single wireless device but the receiver in the multicast or broadcast is plural wireless devices, the multicast or broadcast type is a method more efficiently utilizing the radio resources in view of only the transmission type. However, in the multicast or broadcast of the wireless mesh network, it should be considered that the communication between some mesh peer links can influence third-party MPs.

Therefore, a technical goal of the present invention is to provide a procedure preventing the interference of other mesh peer links in a wireless mesh network and improving the use efficiency of radio resources and a station supporting the procedure.

Another technical goal of the present invention is to provide a procedure preventing the interference of other mesh peer links in a wireless mesh network and distinguishing unicast transmission and broadcast/multicast transmission from each other and a station supporting the procedure.

According to an aspect of the invention, there is provided a mesh deterministic access (MDA) procedure for an intended transmitter in wireless mesh network, the procedure comprising: transmitting a mesh deterministic access opportunity (MDAOP) setup request message including information for specifying times of a new MDAOP set and information for identifying the new MDAOP set to intended receivers, the MDAOP setup request message being a setup request message for a broadcast MDAOP; and receiving an MDAOP setup reply message including a reply code from the intended receivers, the reply code indicating either accept or refusal of the request for the new MDAOP set.

According to another aspect of the invention, there is provided a mesh deterministic access (MDA) procedure for intended receivers in wireless mesh network, the procedure comprising: receiving a mesh deterministic access opportunity (MDAOP) setup request message including information for specifying times of a new MDAOP set and information for identifying the new MDAOP set from an intended transmitters, the MDAOP setup request message being a setup request message for a broadcast MDAOP; and transmitting an MDAOP setup reply message including a reply code from the intended receivers, the reply code indicating either accept or refusal of the request for the new MDAOP set.

According to still another aspect of the invention, there is provided a mesh deterministic access (MDA) procedure in wireless mesh network, wherein the procedure is characterized in that an MDA opportunity (MDAOP) for broadcast transmission is allowed. In the method, wherein the MDAOP for broadcast transmission may be identified by using a value of an MDAOP set ID of a request message for setting up the MDAOP for broadcast transmission. And, a request message for setting up the MDAOP for broadcast transmission may be transmitted from an intended transmitter of the MDAOP to intended receivers of the MDAOP in a unicast, multicast, or broadcast manner.

According to still another aspect of the invention, a request message for setting up the MDAOP for broadcast transmission may include MDAOP starting times and durations in a mesh Delivery Traffic Indication Map (DTIM) chosen by the intended transmitter. If the intended transmitter already owns another MDAOP for broadcast transmission, it may be allowed for the intended transmitter to transmit the request message including the same MDAOP set ID and the same MDAOP starting times and durations as those of the another MDAOP.

According to still another aspect of the invention, a request message for setting up the MDAOP for broadcast transmission may include MDAOP starting times and durations in a mesh Delivery Traffic Indication Map (DTIM) chosen by the intended transmitter. If the intended transmitter already owns another MDAOP for broadcast transmission and the MDAOP set ID and the MDAOP starting times and durations of the request message are same as those of the another MDAOP, it may be allowed for the intended receiver to transmit a reply message including a reply code indicating accept of the request message.

BRIEF DESCRIPTION OF THE DRAWINGS

The above and other features and advantages of the present invention will become more apparent by describing in detail exemplary embodiments thereof with reference to the attached drawings in which.

DESCRIPTION OF THE EXEMPLARY EMBODIMENTS

Hereinafter, an embodiment of the invention will be described with reference to the accompanying drawings.

Figure 1:
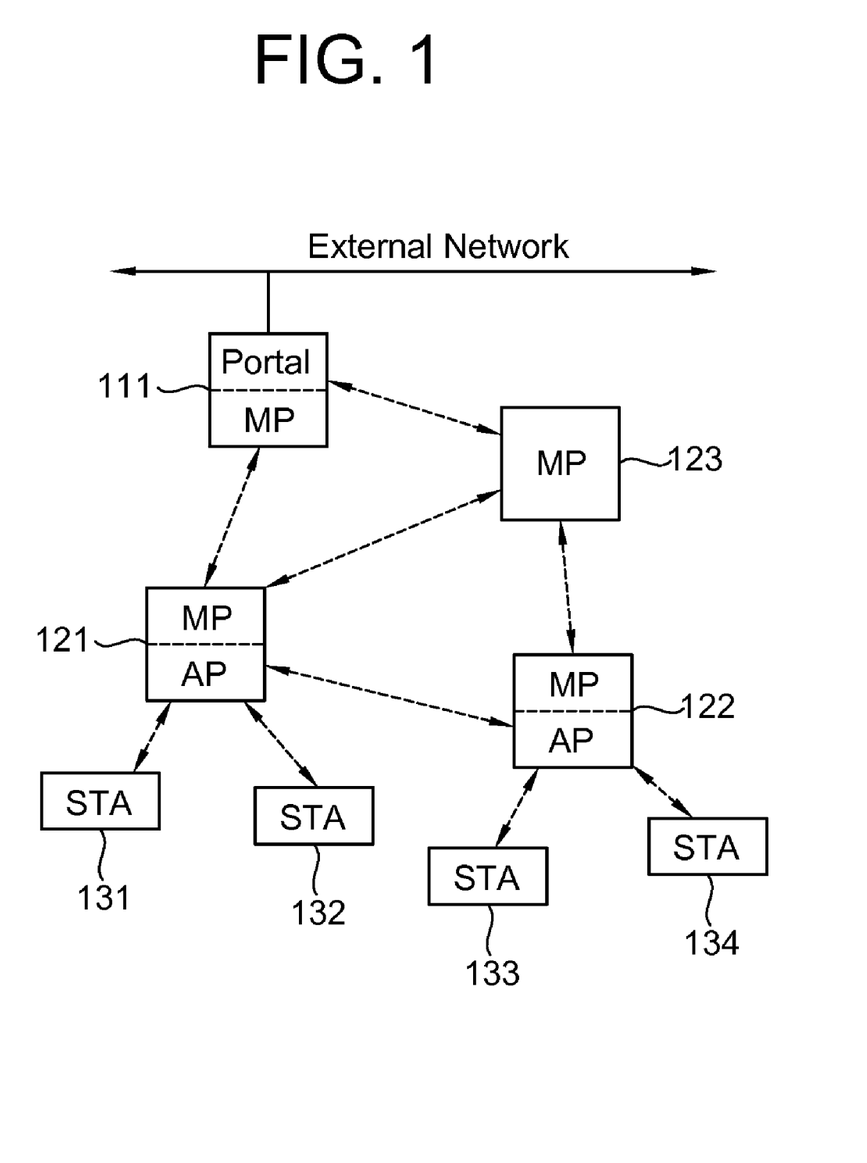
FIG. 1 is a block diagram illustrating a configuration of a wireless mesh network according to an embodiment of the invention.

FIG. 1 is a block diagram illustrating a configuration of a wireless mesh network according to an embodiment of the invention. A wireless mesh network has a proper mesh identifier, which is used as a title for identifying a group of MPs constituting the wireless mesh network. A method of giving the mesh identifier is not limited.

Referring to FIG. 1, the wireless mesh network includes one or more STAs 131, 132, 133, and 134 and one or more wireless stations, that is, MPs 110, 121, 122, and 123. Reference numerals 121 and 122 indicate MPs performing the function of an AP, that is, MAPs, since the STAs 131, 132, 133, and 134 associated therewith exist. Reference numeral 121 indicates an MP connected to an external network by wired or by wireless, which is called a mesh portal.

The STAs 131 to 134 are optional functional mediums including a medium access control interface and a physical layer interface for wireless mediums according to the IEEE 802.11 standard and are non-AP STAS. The STAs 131 to 134 notify their multi-cast subscription information to the MAP 121 or 122. The STAs may be called wireless transmitting/receiving unit (WTRU), user equipment (UE), mobile station (MS), or mobile subscriber unit, in addition to the title of wireless station.

The MPs 110, 121, 122, and 123 are entities constituting the wireless mesh network and are functional entities according to the IEEE 802.11 including the MAC and PHY interfaces according to the IEEE 802.11 standard. The MPs 110, 121, 122, and 123 are wireless devices supporting a mesh service. The mesh service includes all services permitting the direct communication between the MPs in the mesh network. The communication between the MPs for providing the mesh service, for example, the MP 121 and the MP 123, is made through a mesh link or a peer link as the direct link set up between two MPs.

In order to allow two or more MPs to set up peer links with each other to form a mesh network or to allow a different MP to participate in an existing mesh network, the mesh profiles of the MPs to set up the peer links should be necessarily equal to each other. The MPs support at least one mesh profiles. The mesh profile includes a mesh ID, a path selection protocol ID, and a path selection metric ID. The mesh profile may further include a congestion control mode ID.

As described above, an MP also having the function of an AP is particularly called an MAP. Accordingly, the MAPs 121 and 122 also perform the function of an AP for wireless stations associated therewith. The AP may be called convergence controller, base station (BS), node-B, or site controller, in addition to the title of access point.

In the wireless mesh network shown in FIG. 1, it is assumed that a mesh peer link is set up between two MPs indicated by arrows, for example, between an MP 111 and MP 121, between an MP 121 and an MP 122, between an MP 121 and an MP 123, between an MP 122 and an MP 123, and between an MP 111 and an MP 123, and an MP (for example, 121) intends to communicate with a peer MP 122 (for example, 122). In this case, when the peer MP 122 is communicating with another MP (for example, a peer MP 123 of the MP 122 in another mesh peer link) or is communicating through another mesh peer link (a mesh peer link set up between the MP 111 and the MP 123), the MP 121 cannot communicate with the peer MP 122. Accordingly, in the wireless mesh network, in order to efficiently distribute the resources and to alleviate the channel access contention between the MPs, it is necessary to allocate the radio resources in consideration of access times or reserved access times of the peer MP as an opposite party of the mesh peer link and neighboring MPs thereof to the radio resources.

The time period that the peer MPs or the neighboring MPs do not start a transmission sequence need be set as time period for allowing the MP to transmit and receive a message. In this case, the MP selects and determines as a channel access time period a time period when the interference does not occur, by the use of channel access time information of the peer MP and the neighboring MPs. The channel access allowing the MP to exclude the interference of the peer MP or the neighboring MPs is called a mesh deterministic access (MDA).

The MDA can be considered as a method of allowing the MPs to reserve a channel access time. By using this method, the MPs can access a channel at a time selected by lower contention than the normal contention. The MPs should be synchronized with each other to use the MDA. In the following description, an MDA procedure in a wireless mesh network is provided.

To efficiently use the radio resources, it is preferable that an MP can transmit messages or data by broadcast/multicast as well as unicast using the transmission opportunity acquired through the MDA procedure. For this purpose, in the MDA procedure, the MP need determine that the transmission opportunity is for broadcast/multicast transmission with the consent and need advertise the determination to the relevant MPs and the neighboring MPs thereof. In this case, it is necessary to prevent the improper rejection of the transmission opportunity in another MDA procedure after the transmission opportunity for broadcast/multicast transmission is determined. The MDA procedure according to an embodiment of the invention will be described in detail now.

Figure 2:
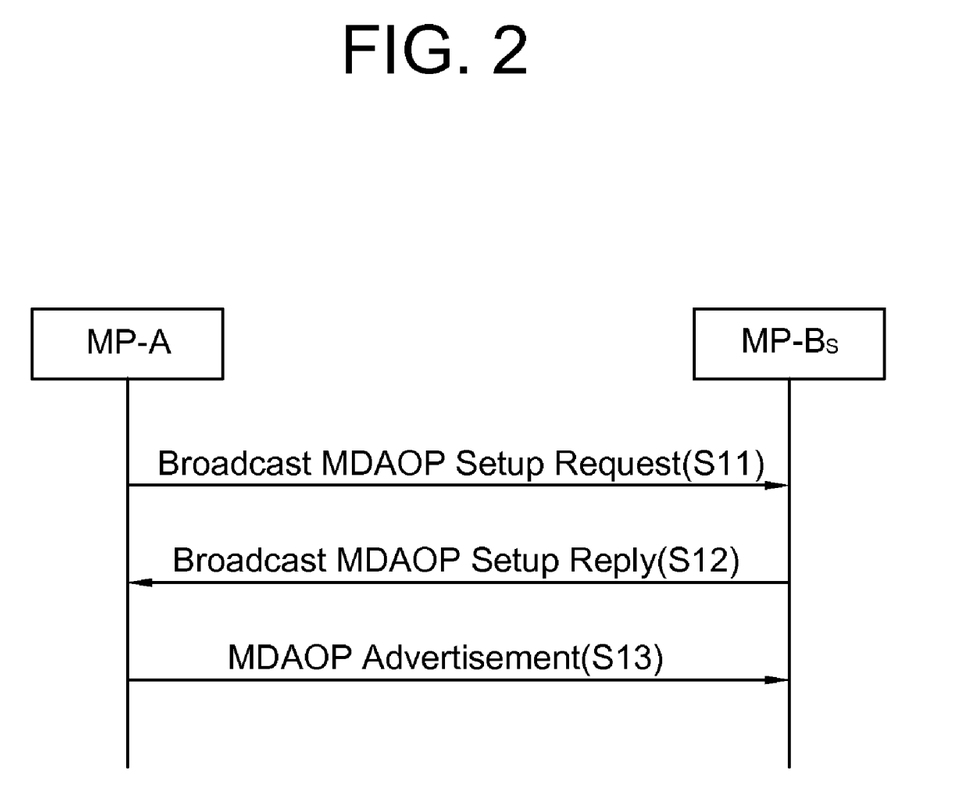
FIG. 2 is a diagram illustrating a flow of messages in an MDA procedure for broadcast/multicast in the wireless mesh network according to the embodiment of the invention.

FIG. 2 is a diagram illustrating a flow of messages in the MDA procedure in a wireless mesh network according to an embodiment of the invention.

Referring to FIG. 2, a transmitting MP MP-A or an initiating MP prepares a map of neighboring MDAOP (MDA Opportunity) times within a mesh delivery traffic indication map (DTIM) interval (S11). The "transmitting MP" or the "initiating MP" is an MP starting an MDAOP setup procedure to be an owner of a new MDAOP set in the wireless mesh network and is an intended transmitter. The "neighboring MDAOP time period" includes all the MDAOPs in which the transmitting MP and the neighboring MPs (that is, receivers intended by the transmitting MP are a transmitter or a receiver. Here, at the time of preparing a map of the neighboring MDAOP, it can include a "neighboring MDAOP interfering time" to be described later.

The transmitting MP MP-A can prepare a map of neighboring MDAOP times after receiving an MDAOP advertisement message received from all the neighboring peer MPs. The MDAOP advertisement message can include TX-RX times report information and interfering times report information. When not receiving the MDAOP advertisement message from one MP of the neighboring MPs for a predetermined time "dot11MDAAdvertPeriodMax", the transmitting AP can request the MPs for the MDAOP advertisement message.

The transmitting MP MP-A transmits an MDAOP setup request message to neighboring MPs MP-Bs (S12). According to the embodiment of the invention, the MDAOP setup request message is used to set up an MDAOP for broadcast and/or multicast transmission. The MDAOP setup request message can include MDAOP setup request information and may be, for example, an MDAOP setup request action frame. Here, the MDAOP indicates a time interval set by an MDA access procedure between the MDAOP owner and the MP addressed in an MDA setup procedure every mesh DTIM interval.

The MDAOP setup request message includes information (MDAOP set ID) for identifying the MDAOP desired by the transmitting MP and information for specifying the MDAOP time. The information for specifying the MDAOP time may be, for example, information on MDAOP start time and MDAOP duration within the mesh DTIM interval. The MDAOP start time and the MDAOP duration can be selected within the mesh DTIM interval on the basis of traffic characteristics acquired using the map of neighboring MDAOP times acquired by the transmitting MP in step S11. In this case, the MDAOP start time and duration are selected so as not to overlap with the neighboring MDAOP times and/or the neighboring MDAOP interfering time, but this is not true when the transmitting MP plans the broadcast MDAOP owned by the transmitting MP in advance. Here, the "neighboring MDAOP interfering time" means an MDAOP time set in TX-RX reports from neighboring MPs of a specific neighboring MP which does not directly participate in the MDAOP time and means a time set as an interfering time in the MDAOP advertisement message from the specific neighboring MP.

The MDAOP set may be plural MDAOPs set for individually address transmission (that is, unicast transmission) from a transmitter to a receiver or plural MDAOPs set for group-addressed transmission from a transmitter. The plural MDAOPs are identified by IDs called MDAOP set IDs). The MDAOP set ID has a value selected by the transmitter. By combining the MDAOP set ID selected by the transmitter with the MAC address of the transmitter, the MDAOP can be identified in the wireless mesh network.

The "broadcast" MDAOP setup request message is a message used to request for an MDAOP for broadcast or multicast transmission to plural receiving MPs. This is different from the unicast MDAOP setup request message used to request for an MDAOP for unicast transmission to one receiving MP. In the embodiment of the invention, by defining the MDAOP for broadcast or multicast transmission, it is possible to efficiently utilize the radio resources through the MDA procedure.

In the embodiment, it is distinguished in the step of transmitting the MDAOP setup request message whether the MDA procedure is for broadcast transmission or unicast transmission. This distinction helps the MP replying to the MDAOP setup request message to determine the rejection or acceptance of the request, which will be described later.

The method of distinguishing the broadcast MDAOP setup request message and the unicast MDAOP setup request message from each other is not particularly limited. According to an aspect of this embodiment, they may be identified using the MDAOP set ID. For example, it is assumed that the value of the MDAOP set ID has a length of 1 octet. Then, when the MDAOP set ID has a value of 0 to 127, it is defined as the unicast MDAOP. When the MDAOP set ID has a value of 128 to 255, it is defined as the broadcast MDAOP. The distinction method using the MDAOP set ID has an advantage that the broadcast MDAOP setup request message and the unicast MDAOP setup request message can be distinguished without adding a particular field for distinction to the MDAOP setup request message.

The broadcast MDAOP setup request message can be transmitted by broadcast, multicast, or unicast. For example, when the request message is transmitted by broadcast or multicast, the broadcast MDAOP setup request message is transmitted only once. On the contrary, when the request message is transmitted by unicast, the broadcast MDAOP setup request message is sequentially transmitted to the receiving MPs.

In steps S11 and S12, when the transmitting MP MP-A owns a broadcast MDAOP, the transmitting MP may select the transmission of the MDAOP setup request message having the same MDAOP set ID set to the same MDAOP time. That is, when a specific time corresponding to the neighboring MDAOP time or the neighboring MDAOP interfering time and the specific time is the broadcast MDAOP time owned by the transmitting MP, the transmitting MP MP-A may transmit the MDAOP setup request message in step S12. In this case, the MDAOP set ID included in the MDAOP setup request message should be equal to the MDAOP set ID of the broadcast MDAOP time owned by the transmitting MP.

When determining the MDAOP duration, the transmitting MP MP-A can consider an MDA access fraction (MAF) of the receiving MP MP-Bs as the neighboring peer MPs. Here, the MAF means a ratio of the total duration of the neighboring MDAOP time to a specific mesh DTIM interval. The transmitting MP should select the MDAOP duration, etc. so that the MAFs of the receiving MPs MP-Bs do not exceed a predetermined MAF limit. When selecting the MDAOP duration, etc. in this step, the transmitting MP MP-A may avoid the time which the transmitting MP or the neighboring peer MPs use for other actions such as beacon transmission.

Figure 3:
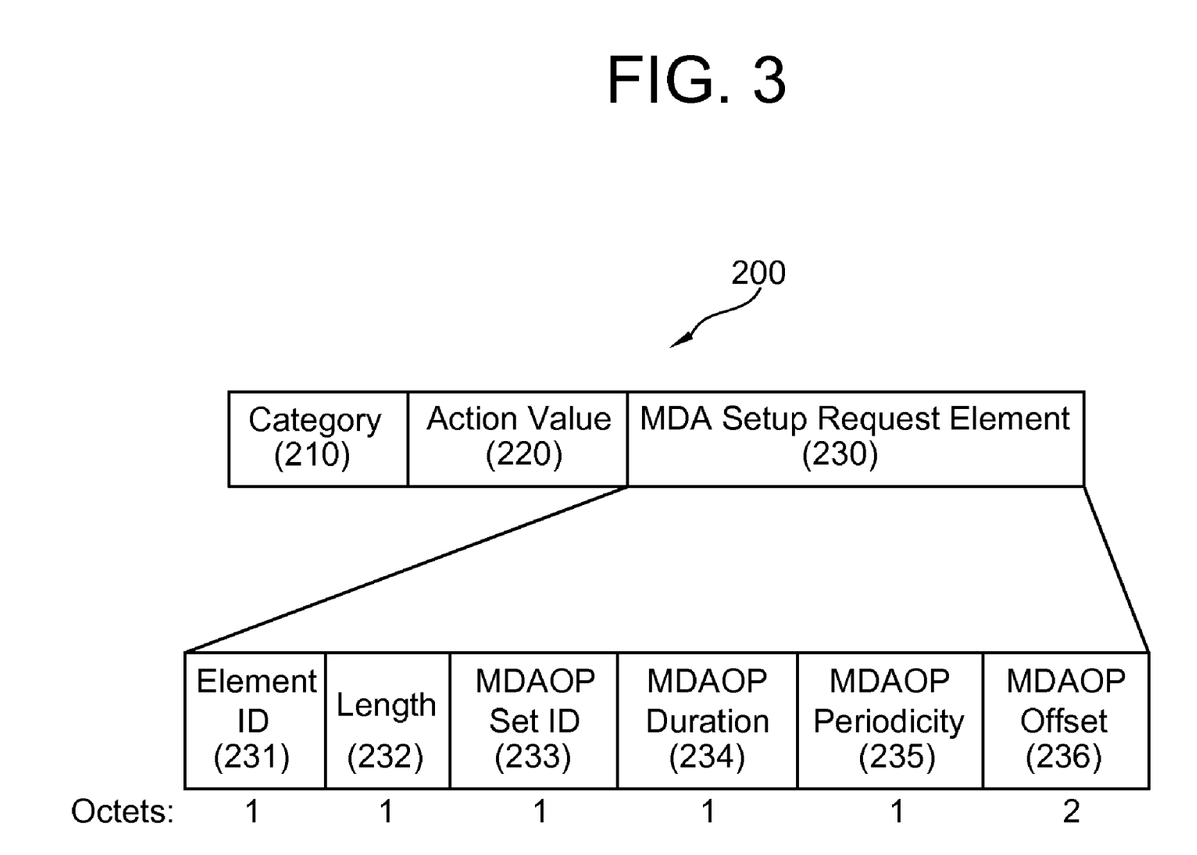
FIG. 3 is a diagram illustrating a format of an MDAOP setup request message used in the MDA procedure according to the embodiment of the invention.

FIG. 3 is a diagram illustrating a format of a broadcast MDAOP setup request frame as an example of the MDAOP setup request message. The broadcast MDAOP setup request frame is an MDAOP setup request action frame of which the MDAOP set ID is set to one of values indicating broadcast.

Referring to FIG. 3, the broadcast MDAOP setup request frame 200 (hereinafter, simply also referred to as "setup request frame") includes a category field 210, an action value field 220, and an MDAOP setup request element field 230. The category field 210 is set to a value indicating a mesh resource coordination category. The action value field 220 is set to the same value as indicating a unicast MDAOP setup request action or is set to an additionally allocated value indicating the broadcast MDAOP setup request as needed. In the former, the unicast MDAOP setup request action and the broadcast MDAOP setup request action need be distinguished using the MDAOP set ID. In the latter, two request actions need not be distinguished using the MDAOP set ID.

The MDAOP setup request element 230 is used for the transmitting MP MP-A to request for the setup of an MDAOP set and is identified by one MDAOP set ID. The MDAOP setup request element field 230 includes an element ID subfield 231, a length subfield 232, an MDAOP set ID subfield 233, an MDAOP duration subfield 234, an MDAOP periodicity subfield 235, and an MDAOP offset subfield 236.

Figure 4:
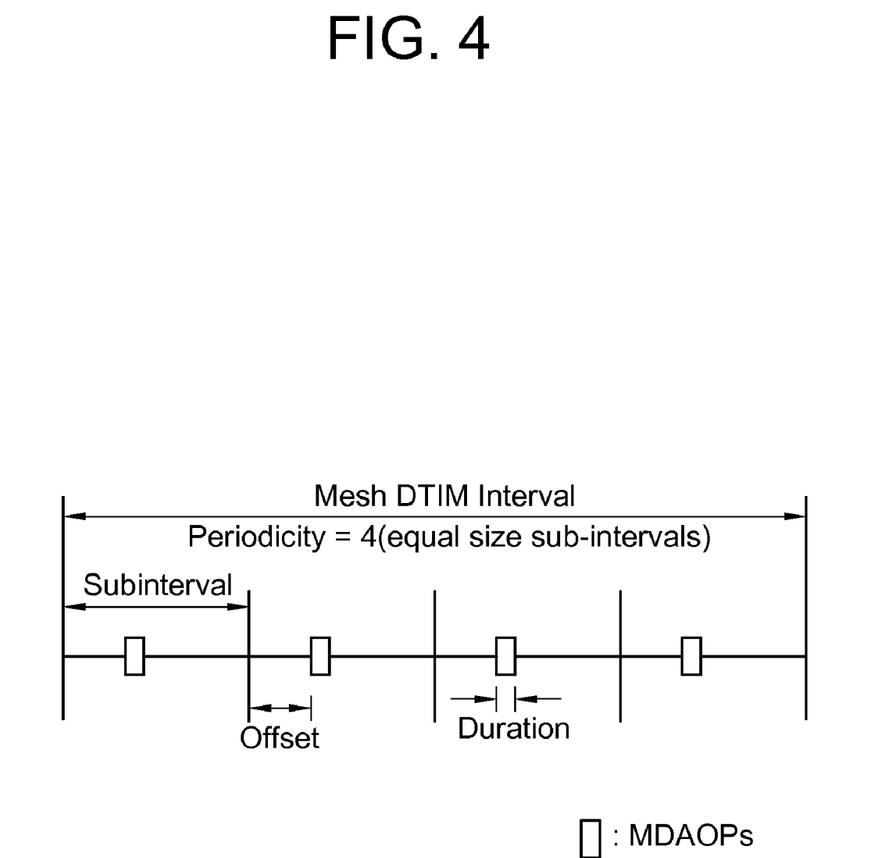
FIG. 4 is a diagram illustrating examples of MDAOP duration, a MDAOP periodicity, and an MDAOP offset included in an MDAOP setup request element.

The element ID subfield 231 is set to a value indicating the MDAOP setup request element. The length subfield 232 is set to, for example, 5 octets. The MDAOP set ID subfield 233 is set to a value indicating the requested MDAOP set and the value is determined by an MDAOP owner. When an MAC address of the MDAOP owner is used along with the MDAOP set ID, the value of the MDAOP set ID subfield 233 uniquely identifies the MDAOP set. The MDAOP duration subfield 234 is set to a value indicating the duration of the MDAOP. The MDAOP periodicity subfield 235 is set to a value indicating the number of sub-intervals into which the mesh DTIM interval is divided. The MDAOP offset subfield 236 is set to a value indicating a position of the sub-interval from the mesh DTIM interval or the subsequent mesh DTIM sub-interval and is used to indicate the start time of the MDAOP. The MDAOP duration, the MDAOP periodicity (for example, 4), and the MDAOP offset are schematically illustrated in FIG. 4.

Referring to FIG. 2 again, the plural MPs MP-Bs having received the broadcast MDAOP setup request message determines whether to accept the received request on the basis of information included in the received setup request message and then transmits an MDAOP setup reply message including the determination result (S13). The reply message is a message including an MDAOP setup reply information element and is not particularly limited in type. For example, the reply message may be an MDAOP setup reply frame.

In this step, the receiving MPs checks whether the MDAOP time included in the request message overlaps with the neighboring MDAOP time, whether the MDAOP time causes the neighboring peer MPs to exceed the MAF limit, and/or whether the MDAOP time overlaps with the time known that the receiving MPs or the neighboring peer MPs use for transmission of a beacon. When the channel access time (MDAOP) set in the MDAOP setup request message is reserved for another MDAOP, that is, when the channel access time is the neighboring MDAOP time or the neighboring MDAOP interfering time, or when the channel access time is the time for transmission of beacons of the receiving MPs or the neighboring peer MPs, and/or when the channel access time causes the neighboring peer MPs to exceed the MAF limit, the MDAOP setup reply message including information indicating that the received MDAOP setup request is not accepted (however, this is not true when the received MDAOP setup request message is a broadcast MDAOP setup request message, which will be described later). In this way, when the MDAOP setup request is rejected, another channel access time may be suggested using the MDAOP setup reply message.

According to the embodiment of the invention, the receiving MPs MP-Bs having received the broadcast MDAOP setup request message transmit a broadcast MDAOP setup reply message including information for accepting the request to the transmitting MP MP-A when it corresponds to one of the following three cases.

First, when the MDAOP does not overlap with the neighboring MDAOP time or the neighboring MDAOP interfering time for unicast or multicast, the receiving MP MP-B accepts the request in principle.

Second, when the MDAOP overlaps with the neighboring MDAOP interfering time but the neighboring MDAOP interfering time is for the same MDAOP owner's broadcast communication, the receiving MP can accept the request.

Third, when the receiving MP receives the broadcast MDAOP advertisement message for the same MDAOP set from the same MDAOP owner and then receives the broadcast MDAOP setup request message, the receiving MP can accept the request. Here, the broadcast MDAOP owner is determined in the process of transmitting the broadcast MDAOP advertisement message. When an MP transmits the broadcast MDAOP advertisement message for a broadcast MDAOP, the broadcast MDAOP owner is the MP transmitting the broadcast MDAOP advertisement message.

The third case is to prevent the receiving MP from rejecting the broadcast MDAOP setup request from the transmitting MP in the following situation. For example, it is assumed that a transmitting MP MP-A sets up a broadcast MDAOP with N neighboring MPs and then sets up a peer link with MP-B. It is assumed that the MP-B receives a broadcast MDAOP advertisement message transmitted from the MP-A after setting up the peer link. Then, the MP-A transmits a broadcast MDAOP setup request message having the same MDAOP set ID to set up an additional broadcast MDAOP with the MP-B. In this case, when the MP-B determines that the broadcast MDAOP setup request is the "neighboring MDAOP time" from the MP-A and rejects the request, the MP-B cannot receive data broadcast from the MP-A in the time reserved by the MDAOP set ID. Accordingly, in the third case, the receiving MP should accept the broadcast MDAOP setup request from the transmitting MP.

Figure 5:
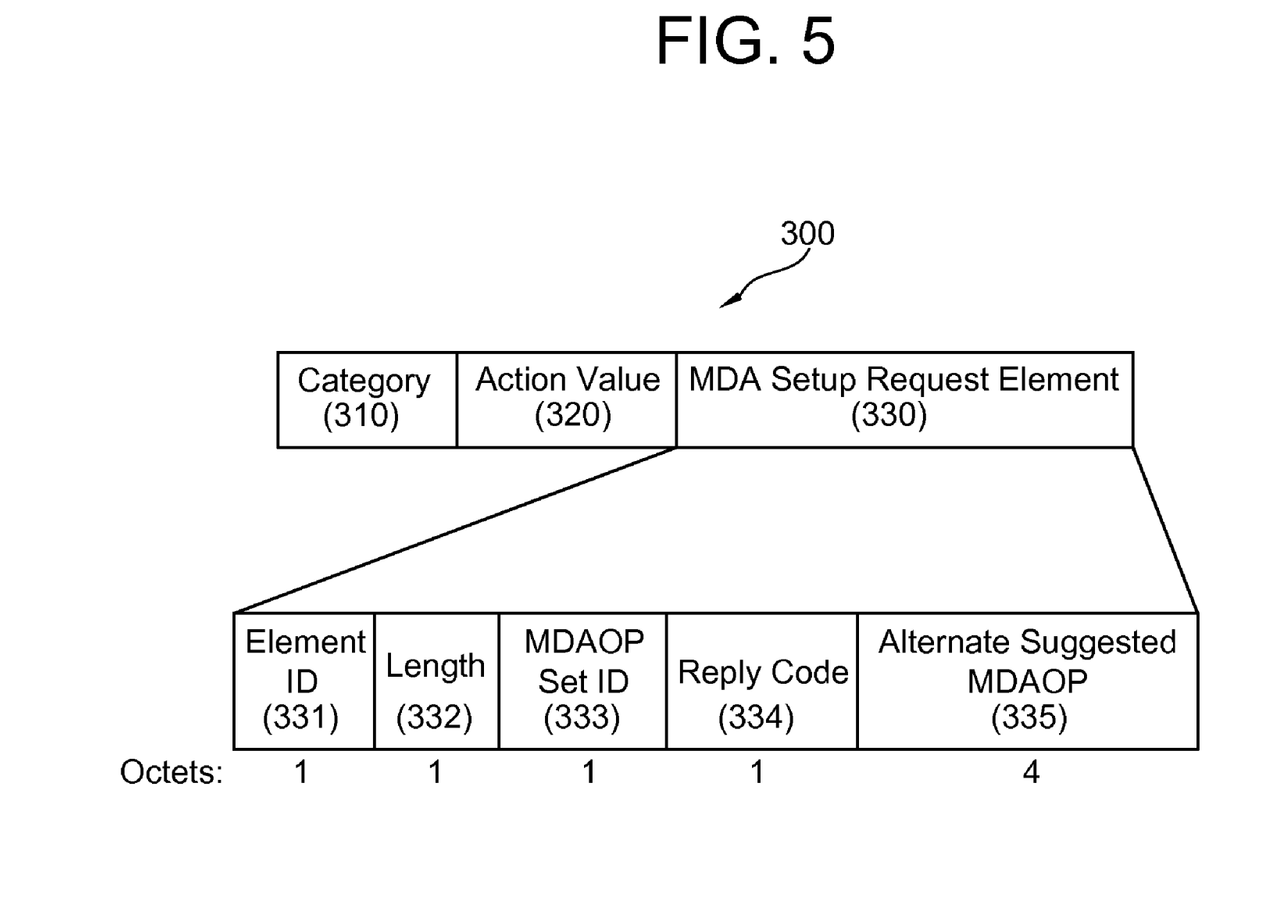
FIG. 5 is a diagram illustrating a format of an MDAOP setup reply message used in the MDA procedure according to the embodiment of the invention.

FIG. 5 is a diagram illustrating a format of a broadcast MDAOP setup reply frame as an example of the broadcast MDAOP setup reply message. The broadcast MDAOP setup reply frame is an MDAOP setup reply action frame in which the MDAOP set ID is set as one of the values indicating broadcast.

Referring to FIG. 5, the broadcast MDAOP setup reply frame 300 (hereinafter, also simply referred to as "setup reply frame") includes a category field 310, an action value field 320, and an MDAOP setup reply element field 330. The category field 310 is set to a value indicating a mesh resource coordination category. The action value field 320 is set to the same value as indicating a unicast MDAOP setup reply action or is set to an additionally allocated value indicating the broadcast MDAOP setup reply as needed. In the former, the unicast MDAOP setup reply action and the broadcast MDAOP setup reply action can be distinguished using the MDAOP set ID. In the latter, two actions need not be distinguished using the MDAOP set ID.

The MMDAOP setup reply element 330 is used for the receiving MP MP-B to reply to the MDAOP setup request and is set to the same MDAOP set ID as included in the received broadcast MDAOP setup request message. The MDAOP setup reply element 330 includes an element ID subfield 331, a length subfield 332, an MDAOP set ID subfield 333, a reply code subfield 334, and an alternate suggested MDAOP subfield 336.

The element ID subfield 331 is set to a value indicating the MDAOP setup reply element. The length subfield 332 is set to, for example, 2 or 6 octets. The MDAOP set ID subfield 333 is set to a value indicating the requested MDAOP set and the value is the same as included in the received broadcast MDAOP setup request frame 200.

Figure 6:
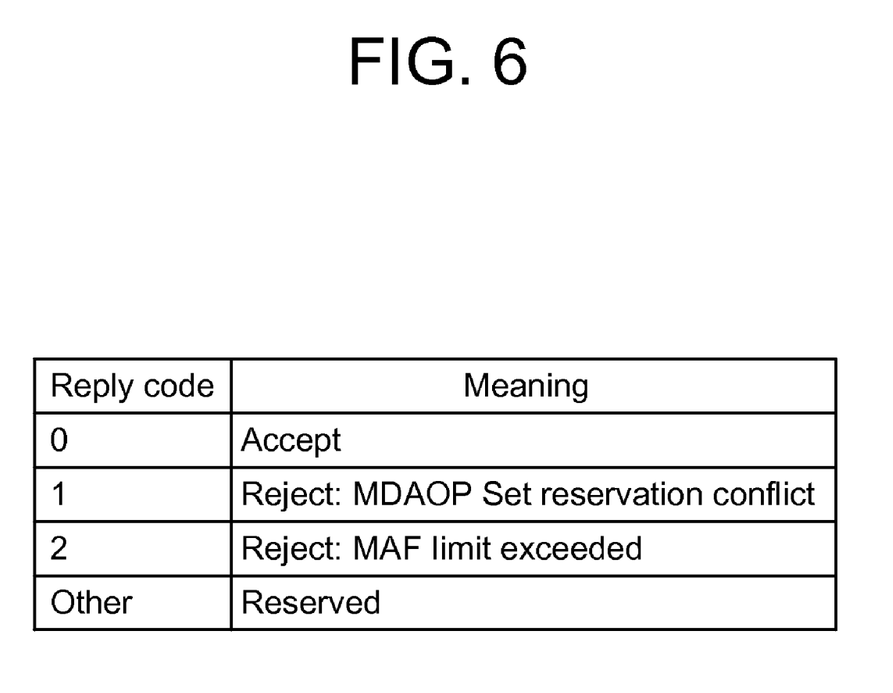
FIG. 6 is a diagram illustrating information indicating a result in reply to the MDAOP setup request message included in a reply code subfield.

The reply code subfield 334 includes information indicating the result of the received broadcast MDAOP setup request frame 200 and an example thereof is shown in FIG. 6. Referring to FIG. 6, the reply code indicates the acceptance or rejection of the request. When the request is rejected, the reply code can be finely divided depending on whether the reason is an MDAOP set reservation conflict or an excess of an MDA access fraction (MAF). The MAF indicates a ratio of the total duration of the neighboring MDAOP time in the mesh DTIM to the duration of the mesh DTIM interval. When the information included in the reply code subfield 334 indicates the rejection of the request, a new MDAOP may be optionally included and transmitted in an alternate suggested MDAOP subfield 336.

When the broadcast MDAOP setup request message and the broadcast MDAOP setup reply message are exchanged between the transmitting MP and the receiving MPs and the MDAOP is set up, the MDAOP owner (the transmitting MP having transmitted the broadcast MDAOP setup request message to reserve the channel access time) tries to transmit data in the reserved channel access time. However, since all the MPs in the mesh network do not support the MDA setup procedure, the MDAOP owner transmits data by backing off the data.

Referring to FIG. 2 again, the receiving MPs MP-Bs having transmitted the broadcast MDAOP setup reply message including the information indicating the acceptance of the setup request and/or the transmitting MP MP-A having received the broadcast MDAOP setup reply message transmits an MDAOP advertisement message (S14). The MDAOP advertisement message includes TX-RX time information and interfering times information and the type is not particularly limited. For example, the MDAOP advertisement message may be a beacon frame or an MDAOP advertisement frame. The MDAOP advertisement message is transmitted at least once within a predetermined time and is always transmitted in the multicast/broadcast type. The MDAOP advertisement message is used to notify other MPs of information that the transmitting MP and the receiving MPs relate to and/or know after the MDAOP setup procedure for broadcast.

In the broadcast MDAOP setup procedure according to the embodiment of the invention, the MDAOP advertisement message can be controlled by the following rules. First, the broadcast MDAOP owner transmits the MDAOP advertisement message including time information on the setup broadcast MDAOP after finishing the broadcast MDAOP setup procedure with all the receiving MPs. The receiving MPs having performed the broadcast MDAOP setup procedure with the broadcast MDAOP owner transmits the MDAOP advertisement message including the time information on the setup broadcast MDAOP after receiving the MDAOP advertisement message from the broadcast MDAOP owner. This rule considers that some receiving MPs may accept the broadcast MDAOP setup request but the other receiving MPs may not accept the broadcast MDAOP setup request.

Figure 7:
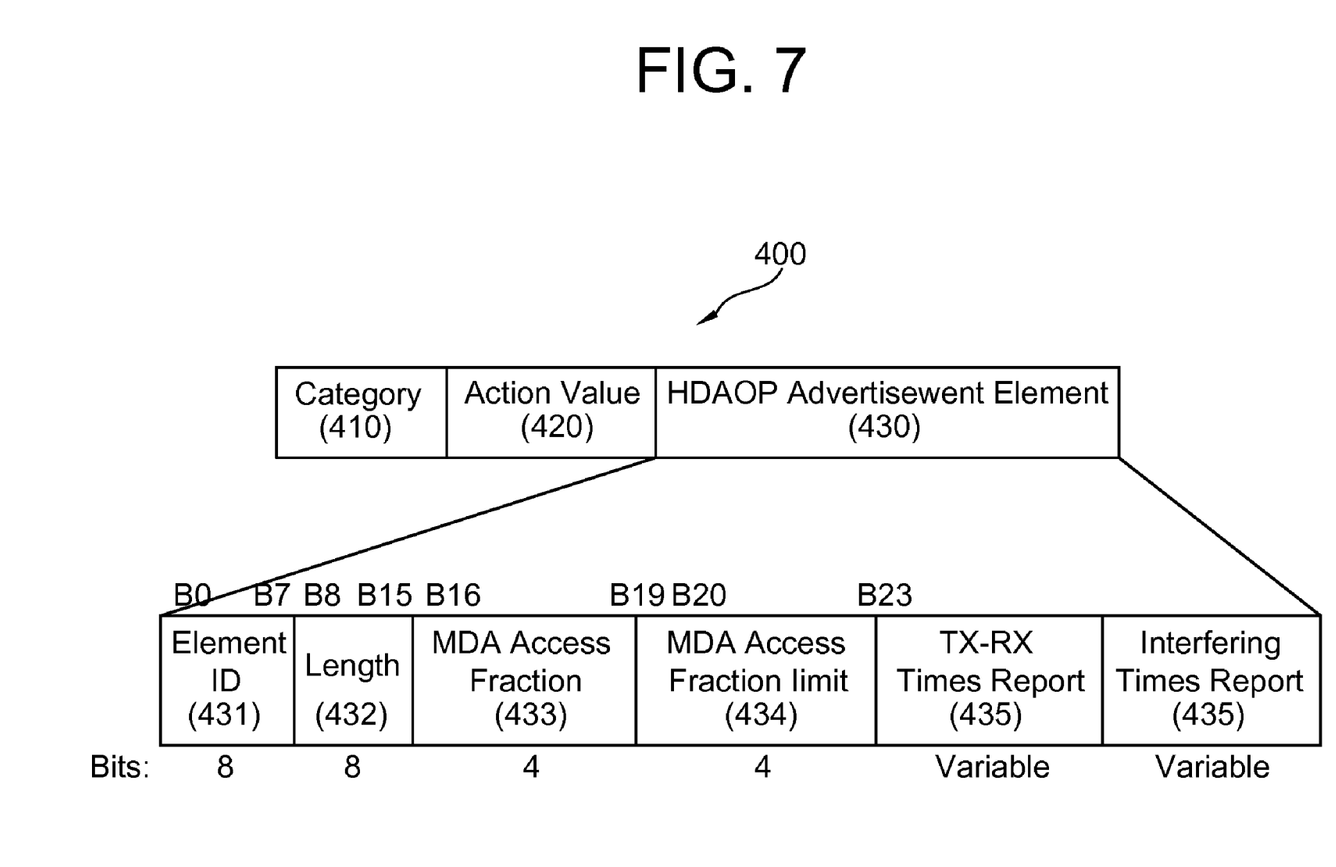
FIG. 7 is a diagram illustrating a format of an MDAOP advertisement message used in the MDA procedure according to the embodiment of the invention.

FIG. 7 is a diagram illustrating a format of an MDAOP advertisement frame as an example of the MDAOP advertisement message. An action frame or a beacon frame can be used as the MDAOP advertisement frame. When the beacon frame is used as the MDAOP advertisement message, an MDAOP advertisement element can be included in the beacon frame.

Referring to FIG. 7, the MDAOP advertisement frame 400 (hereinafter, also simply referred to as "advertisement frame") includes a category field 410, an action value field 420, and an MDAOP advertisement element field 430. The category field 410 is set to a value indicating a mesh resource coordination category. The action value field 420 is set to the same value as indicating a unicast MDAOP advertisement action or is set to an additionally allocated value indicating the broadcast MDAOP advertisement as needed.

The MMDAOP advertisement element 430 includes an element ID subfield 431, a length subfield 432, an MDAOP access fraction subfield 433, an MDA access fraction limit subfield 434, a TX-RX time report subfield 435, and an interfering time report subfield 436. The element ID subfield 431 is set to a value indicating the MDAOP advertisement element. The length subfield 432 is set to a value indicating the length of data included in the subsequent subfields 433 to 436. The MDA access fraction subfield 433 is set to a current value of the MDA access fraction. The MDA access fraction limit subfield 434 is set to a value indicating the maximum MDA access fraction permitted in the MP.

The TX-RX time report subfield 435 is used to advertise the time reserved for a channel in which the MP is the transmitter or the receiver in the mesh DTIM interval and can include unknown TX-RX reserved time other than the MDAOP, as well as known reserved time. The TX-RX time report subfield 435 may be used to advertise the time in which the transmitting MP MP-A knows that the channel is busy or reserved.

The interfering time report subfield 436 is equal to the TX-RX time report subfield 435 in format, but is different in information included therein. That is, the interfering time report subfield 436 includes information indicating the TX and/or RX time of the neighboring MPs which one of the neighboring MPs of the MP knows on the basis of the TX-RX time report subfield in the MDAOP advertisement message transmitted by the neighboring MPs.

Figure 8:
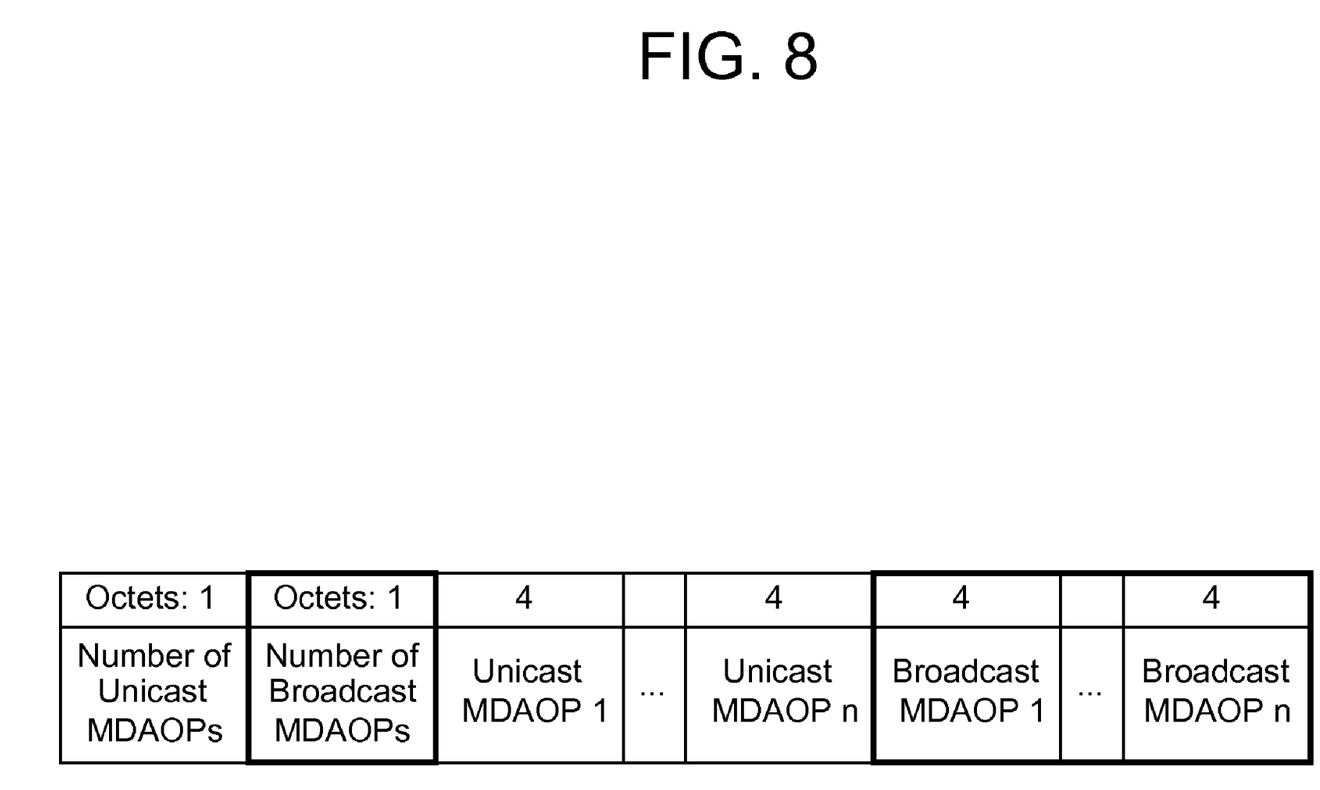
FIG. 8 is a diagram illustrating a format of an RX-TX time report field or an interference time report field according to the embodiment of the invention.

FIG. 8 is a diagram illustrating a format of the RX-TX time report subfield 435 or the interfering time report subfield 436 according to the embodiment of the invention. Referring to FIG. 8, the RX-TX time report subfield 435 or the interfering time report subfield 436 includes a number of unicast MDAOPs subfield, unicast MDAOP subfields Unicast MDAOP1, Unicast MDAOP2, ..., Unicast MDAOPn corresponding to the number of unicast MDAOPs, a number of broadcast MDAOPs subfield, broadcast MDAOP subfields Broadcast MDAOP1, Broadcast MDAOP2, ..., Broadcast MDAOPm corresponding to the number of broadcast MDAOPs. The unicast MDAOP subfields and the broadcast MDAOP subfields include detailed information on the MDAOP reserved as the transmitter or the receiver in the MPs or detailed information on the MDAOP of the neighboring MPs that may interfere with the MPs.

An access behavior of an MDAOP owner and MDAOP non-owners during the MDAOP will be described now. In the wireless mesh network, the MPs supporting the MDA (MDA-supporting MPs) procedure purchase the neighboring MDAOP times. Here, the neighboring MDAOP time means a time when the MPs or the neighboring peer MPs are a transmitter or a receiver.

When an MP is an MDAOP owner and an MSDU (MAC Service Data Unit) relating to an MDA session and to be transmitted exists, the MP tries to acquire the transmission opportunity TXOP using the contention of EDCA (Enhanced Distributed Channel Access) and backoff parameters. When the MP completely exchanges messages with a receiver, the MP successfully acquires the transmission opportunity. The MP having acquired the transmission opportunity can transmit data until reaching the EDCA TXOP limit of the MSDU in the access category. When the MP reaches the TXOP limit before the MDAOP is ended, the MP tries to transmit an additional MSDU relating to the MDA session by accessing a channel again to acquire the subsequent transmission opportunity during the MDAOP. When the MP tried to access a channel but fails to acquire the transmission opportunity first or additionally, the MP should perform a backoff procedure. When the MP prepares a channel access for retransmission during a time other than the MDAOP, the MP should avoid the channel access during the MDAOP time of the neighboring MP by setting the MDAOP time to an NAV (Network Allocation Vector).

All the MDAOP-supporting MPs other than the MDAOP owner should delay the start of transmission during the transmission opportunity started in the MDAOP. The MPs other than the current MDAOP owner can start the contention for channel access after the transmission opportunity started in the current MDAOP is ended.

According to the embodiments of the invention described above, a transmitting MP intending to transmit data in a broadcast type or a multicast type can set up an MDAOP for broadcast transmission with plural receiving MPs. In this case, an MDAOP setup request message for broadcast transmission and an MDAOP setup request message for unicast transmission can be simply distinguished using an MDAOP set ID. When the transmitting MP owns another MDAOP for broadcast transmission in advance but the time period correspond to a neighboring MDAOP time period or a neighboring MDAOP interference time period, the transmitting MP, the transmitting MP can transmit an MDAOP setup request message having the same MDAOP set ID for the same time period during the another MDAOP.

The embodiments described above in detail are only examples explaining the technical spirit of the invention and it should be understood that the technical spirit is not limited to the embodiments. The scope of the invention is defined by the appended claims.

What is claimed is:

1. A method for mesh deterministic access (MDA) for an intended receiver in a wireless mesh network, the method comprising:

receiving, from an intended transmitter, a mesh deterministic access opportunity (MDAOP) setup request message for requesting an MDAOP for transmission, the MDAOP setup request message including information for specifying an MDAOP time of the MDAOP and information for identifying the MDAOP, the MDAOP setup request message being a setup request message for a multicast MDAOP;

transmitting, to the intended transmitter, an MDAOP setup reply message including a reply code indicating either acceptance or refusal of the request for the MDAOP; and advertising an MDAOP advertisement message, wherein the MDAOP is included in the MDAOP advertisement message after the intended receiver has received an MDAOP advertisement message from the intended transmitter if the reply code indicates the acceptance of the request for the MDAOP, and wherein the reply code further indicates a reason for refusal if the reply code indicates the refusal of the request for the MDAOP.

2. The method as claimed in claim 1, further comprising:
checking if the MDAOP overlaps with neighborhood MDAOPs of the intended receiver.

3. The method as claimed in claim 2,
wherein the reply code indicates the acceptance of the request for the MDAOP if the MDAOP does not overlap with the neighborhood MDAOPs of the intended receiver.

4. The method as claimed in claim 1,
wherein the information for specifying the MDAOP time includes selected MDAOP starting times and durations within a mesh Delivery Traffic Indication Map (DTIM).

5. The method as claimed in claim 1, further comprising:
checking if an MDA Access Fraction (MAF) limit of the intended receiver or neighbor peer mesh points (MPs) of the intended receiver will be exceeded due to the MDOAP time,
wherein the reply code indicates the refusal of the request for the MDAOP if the MAF limit of the intended receiver or the neighbor peer MPs will be exceeded.

6. The method as claimed in claim 1,
wherein the MDAOP setup request message is an action frame including an MDAOP request information element,
wherein the information for specifying the MDAOP time and the information for identifying the MDAOP are included in the MDAOP request information element, and
wherein a field for the information for identifying the MDAOP is set to a value of a plurality of values for MDAOPs for multicast transmission.

7. The method as claimed in claim 6,
wherein the MDAOP setup reply message is an action frame including an MDAOP reply information element,
wherein the MDAOP reply information element includes a reply code field for the reply code and an MDAOP set ID field, and
wherein the MDAOP set ID field are set to a same value as a value indicated by the information for identifying the MDAOP.

8. A wireless device for supporting mesh deterministic access (MDA) for an intended receiver in a wireless mesh network, the wireless device comprising:
a processor configured to generate and process messages; and
a transceiver operably connected to the processor and configured to transmit and receive the messages for the processor,
wherein the transceiver is further configured to:
receive, from an intended transmitter, a mesh deterministic access opportunity (MDAOP) setup request message for requesting an MDAOP, the MDAOP setup request message including information for specifying an MDAOP time of the MDAOP and information for identifying the MDAOP, the MDAOP setup request message being a setup request message for a multicast MDAOP;
transmit, to the intended transmitter, an MDAOP setup reply message including a reply code indicating either acceptance or refusal of the request for the MDAOP; and
advertise an MDAOP advertisement message,
wherein the MDAOP is included in the MDAOP advertisement message after the wireless device has received an MDAOP advertisement message from the intended transmitter if the reply code indicates the acceptance of the request for the MDAOP, and
wherein the reply code further indicates a reason for refusal if the reply code indicates the refusal of the request for the MDAOP.

* * * * *